(No Model.)
H. F. MILEY.
SEED PLANTING AND FERTILIZER DISTRIBUTING ATTACHMENT FOR HAND PLOWS.
No. 350,835. Patented Oct. 12, 1886.
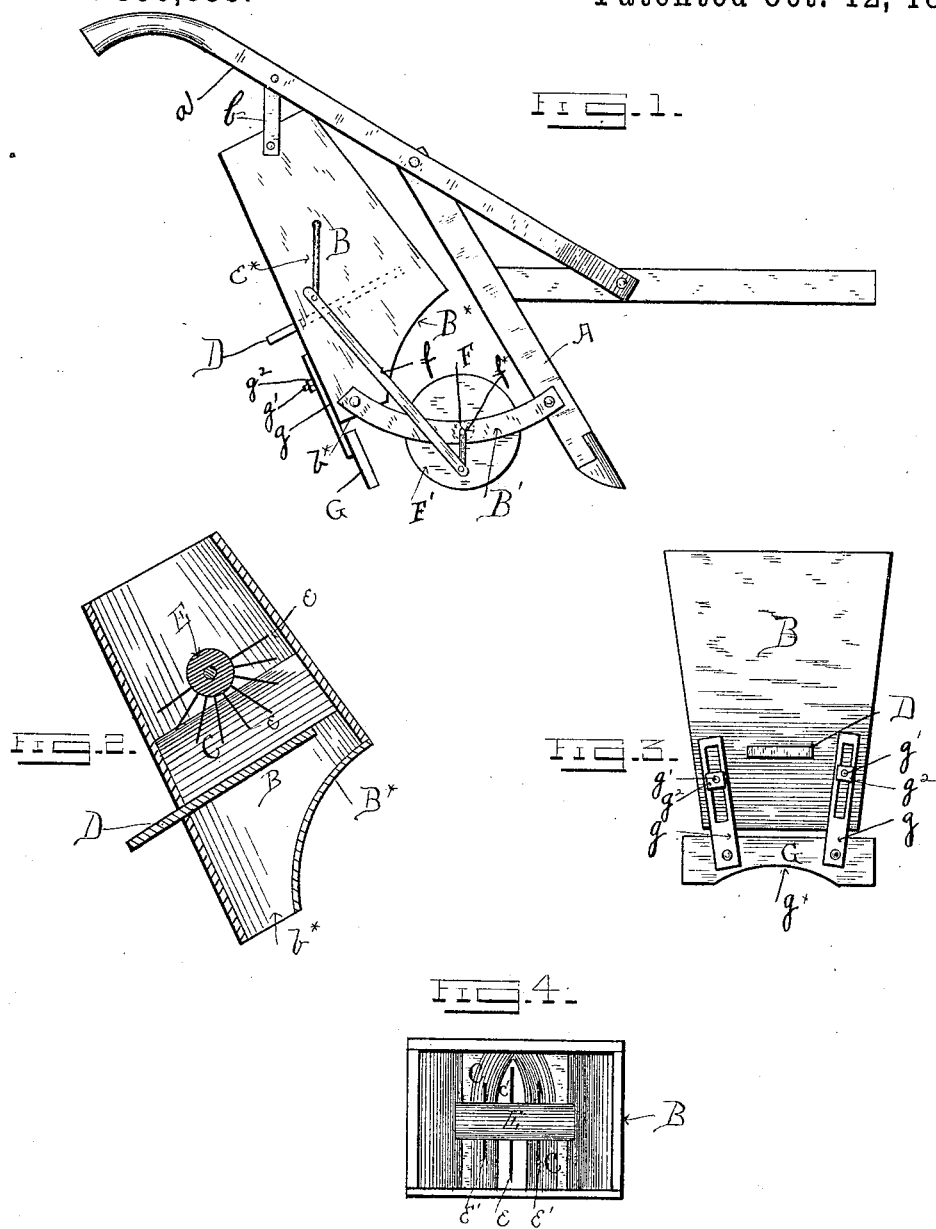

UNITED STATES PATENT OFFICE.

HENRY F. MILEY, OF VALDOSTA, GEORGIA.

SEED-PLANTING AND FERTILIZER-DISTRIBUTING ATTACHMENT FOR HAND-PLOWS.

SPECIFICATION forming part of Letters Patent No. 350,835, dated October 12, 1886.

Application filed April 29, 1886. Serial No. 200,510. (No model.)

*To all whom it may concern:*

Be it known that I, HENRY F. MILEY, a citizen of the United States, residing at Valdosta, in the county of Lowndes and State of Georgia, have invented certain new and useful Improvements in Seed-Planting and Fertilizer-Distributing Attachments for Hand-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to seed-planting and guano or fertilizer distributing attachments to plows, and has for its object the provision of a simple and effective device for this purpose, which can be used for either of the purposes above designated, and which will not only drop the seed or distribute the fertilizing material, but will at the same time guard against the possibility of the receptacle becoming clogged, and will cover the furrow into which the seed or material has been deposited.

I provide a receptacle or box, which is held or supported upon the handles and standard of the plow in such a way as not to impede the proper working of the plow nor interfere with the steps of the plowman. This box is provided with a pair of cheeks, which form the base of the containing-receptacle, with a tapering opening between them through which the seeds or fertilizer are dropped. The size of this opening is controlled by a slide, which projects from the rear of the box and which can be pushed in or drawn out to vary the size of the escape-opening and regulate the amount of material dropped through. Underneath the containing-receptacle is a chamber or chute, with an inclined wall on the front side and an opening between said wall and the rear side. The seed or fertilizer passing through the escape-opening will be guided by the inclined wall out through the bottom of the box. Above the cheeks is mounted a stirrer, which consists of a rock-shaft with stirring-arms or teeth mounted on one side. The rocking movement of the stirrer is produced by connecting a crank upon the end of the shaft with the cranked shaft of a traction-wheel, which bears upon the ground and is thereby caused to revolve. Upon the rear side of the box is attached, by suitable straps or hangers, a covering device, which consists of a suitable piece of flat metal or board hollowed out on one edge, which rides over the ground and serves to throw the loose earth back upon the planted row. The height of this covering device can be regulated as may be desired to throw more or less earth and cover deeper or shallower, according to circumstances.

The accompanying drawings illustrate what I consider the best means for carrying my invention into practice.

Figure 1 is a side elevation of a plow with my attachment secured upon it. Fig. 2 is a central vertical section of the box. Fig. 3 is a rear elevation of the box; Fig. 4, plan view of the box.

Similar letters of reference indicate corresponding parts in all the figures where they occur.

A is the plow-standard, and *a a* the handles.

B is my seed or fertilizer containing box or receptacle, which is attached by straps or hangers *b* to the plow-handles, and by curved braces B' to the lower part of the standard. At a suitable point in the height of the box is placed the rounded cheeks C C, which form the base of the seed or fertilizer receptacle, and have a tapering opening, *c'*, between them, through which the seed or fertilizer passes. The under side of the cheeks is plane, and a slide or regulator, D, which enters through an opening in the back of the box, passes under them and can be pushed or placed further in or out to vary the size of the escape-opening. The part or portion of the box below the cheeks is provided with an inclined bottom, B*, which slopes downward and backward from the front of the box, but does not quite reach the rear, leaving an open space or exit, *b*\*, through which the seeds or fertilizer drop into the furrow in the rear of the shovel. All the seeds or fertilizer escaping or passing through the escape-opening *c'* will be guided out through the exit *b*\* by the inclined bottom B*. Above the cheeks C C is mounted a stirrer-shaft, E, provided on one side with lines of stirring or feed arms *e e' e'*. The central line, *e*, is longer than the side lines, and this central line extends down into the space between the rounded cheeks.

Motion is given to the shaft E by means of a crank, $e^*$, on the end thereof, extending outside of the box. A link, $f$, is loosely connected with the crank $e^*$, and is also connected to a crank, $f^*$, on a shaft, F, placed in the inclined braces B' in such position as to bring a traction or rolling wheel, F', upon the ground in the rear of the furrow. The wheel F' is carried upon the shaft F between the braces B'. By having the connection between link $f$ and crank $e^*$ loose, the rotation of shaft F and the revolutions of the crank $f^*$ give a rocking motion to shaft E and cause the stirring pins or arms to move back and forth over and between the cheeks, thus causing the fertilizer or seeds to be fed through the escape passage $c'$.

On the rear of box B is attached or hung the coverer G, which has a concave edge, $g^*$, on the lower side, so as to cause the earth to be ridged or heaped up over the furrow or row. The coverer is suspended by means of straps or hangers $g$ $g$, which are secured to back of the box by means of bolts $g'$ and nuts $g^2$. To provide for covering the row deeper or shallower, the coverer may be made adjustable by having slots in the hangers $g$ $g$, by which they may be raised or lowered upon the back of the box, as shown in Fig. 3. The same arrangement can be made with hangers $b$ $b$ to raise or lower box B.

Having thus described my invention, what I desire to claim, and secure by Letters Patent, is—

1. In a seed and fertilizer distributer for plows, the combination of a box, as B, having the hangers or straps $b$ $b$ for attaching it to the plow-handles, and the braces B' for securing it to the lower part of the standard, the rounded cheeks or bottom C C, placed in said box, having a space, $c'$, between them, the slide or feed-regulator D, extending through the back of the box beneath said cheeks or bottom, and means, substantially as described, for stirring and feeding the seed or fertilizer in the box, as set forth.

2. In a seed or fertilizer distributer for attachment to plows, the combination, with box B, having the curved braces B' securing the bottom thereof to the lower part of the standard, the cheeks C C, and slide D, located in the body thereof, of the stirring-shaft E, having the lines of stirring-arms, crank $e^*$ on shaft E outside of box, shaft F, mounted in the curved braces B', wheel F* on shaft F between said braces, crank $f^*$ on shaft F, and link $f$, connecting cranks $f^*$ and $e^*$, all substantially as and for the purpose set forth.

3. In a seed and fertilizer distributer, the combination, with the box B, having the braces B' for securing it to the base of the standard, and the straps $b$ $b$ for securing it to the handles of the plow, and provided with the cheeks or bottom C C at a suitable point in its body, of a stirring-shaft, E, having the stirrers, a wheel, F*, and shaft F, held in the braces B', and connections to the shaft E, and the adjustable covering-board G, secured on the rear of the box in the manner and for the purpose set forth.

In testimony whereof I affix my signature in presence of two witnesses.

HENRY F. MILEY.

Witnesses:
H. A. MILEY,
B. L. STEPHENS.